United States Patent Office 2,845,378
Patented July 29, 1958

2,845,378

METHOD OF FORMING A FRICTIONAL ELEMENT AND PRODUCT

John E. Dereich, Painesville, Ohio, assignor to Diamond Alkali Company, Cleveland, Ohio, a corporation of Delaware No Drawing. Application February 7, 1955
Serial No. 486,737

9 Claims. (Cl. 154—52)

This invention relates to compositions of matter comprising siloxanes, and more particularly relates to compositions comprising siloxane materials which render such materials especially suitable as friction elements, such as brake linings, clutch facings, and the like.

The expression "friction element," as used throughout the specification and claims, is intended to mean a frictional energy-absorbing member of an energy transfer mechanism for accelerating or decelerating motion in a mechanical system.

It has heretofore been broadly suggested that siloxanes, particularly the resinous siloxanes, are excellent as bonding materials in friction element compositions, principally because of their oil, grease, and heat resistance. Investigation has shown, however, that not all or even many of the various types of resinous siloxanes are satisfactory for such purposes, especially since much more than mere oil, grease, and heat resistance is required of the bonding material in a friction element. Moreover, it has been found by investigation that the effectiveness of even the most suitable siloxane materials in such compositions is substantially affected by the additives admixed therewith.

Prior siloxane friction elements generally have contained a substantial amount of a filler, asbestos being one of the most widely used fillers. Various problems in the choice of asbestos fillers have arisen in the past, which problems result by the practical necessity of using either fibrous asbestos or asbestos cloth as a source of this important heat-resistant, high-strength, filling material. It has been found that when fibrous asbestos is incorporated into a siloxane composition, while the advantages of ready fabrication of brake linings and other friction elements by extrusion are enjoyed, the resultant friction elements heretofore have been characterized by relatively poor strength and brittleness which have combined to impart low shock resistance. It will be appreciated, of course, that despite the high heat resistance and other advantages of siloxane friction elements, the foregoing disadvantages have precluded the use of such materials in numerous applications.

When one employs a web form of asbestos, e. g., a woven cloth, as a filler, the resultant friction element does have an improved strength, as compared to elements incorporating fibrous asbestos. However, serious difficulties are encountered in the fabrication of friction elements using an asbestos cloth filler, since manufacture of these elements by extrusion or other convenient large-scale manufacturing techniques is difficult. Accordingly, it is generally necessary to impregnate asbestos cloth with the siloxane resin and subsequently to form laminated friction element structures. However, apart from the difficulty involved in fabrication is the heretofore frequently encountered more serious problem caused by poor impregnation of the asbestos cloth by the siloxane resin. For example, it has been found that the woven fibers serve effectively as a filter to prevent uniform penetration into the cloth by the siloxane resin. Moreover, such filtering action is uneven and erratic, resulting in a friction surface having irregularly disposed areas of substantially untreated asbestos cloth, which areas, of course, wear readily and cause early surface failure.

It is, therefore, a principal object of the present invention to avoid the difficulties heretofore encountered in the fabrication of siloxane resin-containing friction elements and to provide improved siloxane friction elements.

A further object of the invention is the provision of siloxane resin-containig friction elements characterized by improved heat resistance and frictional surface quality, as well as high strength and shock resistance.

A further object of the invention is to provide a method of forming improved friction elements.

These and other objects and advantages of the invention will appear more fully from the following description.

The present invention comprises a friction element including a siloxane resin-containing friction surface having a heat-resistant thermosetting resin backing integrally bonded thereto.

More particularly, the present invention is directed to a friction element comprising a frictional surface-providing layer of a siloxane resinous material backed by an integrally bonded, high-strength, heat-resistant resinous thermosetting material, and to novel methods of preparing such structures.

As used in the specification and claims, the expressions "siloxane resin" and "siloxane resinous materials" are intended to include heat-curable, silicon-containing materials characterized by alternating silicon and oxygen atoms, which materials have adhesive or binder properties and set to a solid, hard, heat-resistant substance. While a variety of siloxane resins are suitable, particularly effective are the resinous hydrolyzates of silicon trihalides, e. g., chlorides, bromides, fluorides and iodides, chlorides being preferred, and cohydrolyzates of aryl and alkyl silicon trihalides, as disclosed in U. S. Patents Nos. 2,611,727, 2,637,719, 2,648,654, 2,658,881, and 2,684,354. Organic silicon compounds of the foregoing types constitute the presently preferred siloxane materials. It will be understood that in certain instances commercially available siloxane resins, as well as the thermosetting resins employed, may contain various additives, including asbestos or other fillers, catalysts, e. g., 0.05 to 0.2% by weight of lead naphthenate, triethanolamine, or lead octoate, as well as curing and/or mold release aids, and the like. Accordingly, the expression "resin," as used in the specification and claims, is intended to include such commercially available resins containing asbestos, other fillers, or additional ingredients present in commercial resins.

Illustrative of a specific preferred siloxane resin is the siloxane obtained by cohydrolyzing a mixture of a phenyl silicon trihalide, preferably phenyl silicon trichloride, and an ethyl silicon trihalide, preferably ethyl silicon trichloride, in the amounts of 80 mol percent of the phenyl silicon trihalide and 20 mol. percent of the ethyl silicon trihalide. Siloxanes of this type, in combination with asbestos and other fillers, are disclosed in U. S. Patent No. 2,658,881.

In forming friction elements embodying the present invention it is essential to employ some type of filler material for use both with the siloxane resin and with the thermosetting resin backing. Such filler must have a low rate of heat expansion, must not evolve an appreciable amount of gas on heating, or have a low decomposition temperature. Suitable materials may include finely-divided silica, asbestos, ground glass, diatomaceous earth, clay, iron oxide, alumina, titania, and other inorganic, heat-stable materials. Those skilled in the art will recognize, of course, that asbestos is a widely used filler in the friction element art. Asbestos is the preferred filler in the practice of this invention.

Generally, any high-strength, heat-resistant, thermosetting resin may be used in order to form the backing for the siloxane resin. Illustrative of such materials are melamine formaldehyde resins and phenol formaldehyde resins. One such material which has been found advantageous is the product known as Durez 34, produced commercially by The Durez Plastic & Chemical Company. However, because of cost considerations, the phenolic resins, particularly the phenol formaldehyde type resins, are presently preferred. Commercial phenol formaldehyde resins, as well as other thermosetting resins, frequently contain additives to control the flow characteristics and/or other properties of the resin. For example, such resins often include a catalyst, such as hexamethylene tetramine, to facilitate heat curing.

The thermosetting resin preferably is employed in the form of a finely-divided material containing a substantial amount of filler. While any of the foregoing types of inorganic fillers may be used, in order to obtain superior strength it is generally advantageous to employ a phenol formaldehyde resin containing, as a filler, a substantial amount of asbestos fiber. The proportions of siloxane resin and thermosetting resin to be employed in forming a friction element, of course, depend on the particular application intended. In general, the proportions may be varied within wide limits, although it is usually preferable to minimize the amount of backing used. Typically practicable proportions comprise 25–35% by weight of the backing resin and 65–75% by weight siloxane resin.

Asbestos is employed in the compositions of the present invention in amounts ranging from 20% to 75% by weight, either in the form of loose fibers or as webs, such as asbestos paper or cloth. Asbestos in either of these forms increases the tensile strength of molded articles obtained from these compositions and, in addition, provides a friction element composition of superior wear resistance and friction properties. As will now be understood, the practice of this invention permits the use of fibrous asbestos in forming friction elements which avoid the heretofore-mentioned difficulties inherent in the prior art friction elements.

Commercial grades of fibrous asbestos of uniform fiber length, such that none is retained on a screen having 0.5" openings, approximately 75% is retained on a 12 mesh screen, and the remaining 25% passing 12 mesh screen is retained on a 16 mesh screen, are especially suitable in the compositions of the present invention when used in amounts ranging from 20% to 50% by weight. Expressed in terms of fiber length, it is presently preferred to employ asbestos fibers having lengths from ¼" to ½". A commercial grade representative of this type is manufactured by the Johns-Manville Company and available as their grade "5–K." In addition, it has been found that webs of asbestos fibers, such as asbestos paper or woven asbestos cloth, generally ranging from 50% to 75% of the total weight of the compositions, also may be employed.

Small amounts, of the order of 2% to 10% of the total weight of the compositions, of heat-resistant synthetic elastomeric polymers and copolymers, for example, copolymers of the butadiene-acrylonitrile type which are commercially available under the trade-name "Hycar," from The B. F. Goodrich Company, also may be included in the siloxane compositions, and such polymers and copolymers apparently function as plasticizers for the siloxane component of the compositions, thereby decreasing the brittleness of the siloxane binder and increasing the tenacity of the molded composition.

Graphite may also be incorporated, if desired, particularly when the compositions are to be molded into friction elements. The amount of graphite, when so used, is preferably of the order of 1% to 5% of the total weight of the compositions.

In addition to the foregoing materials which may be incorporated in friction elements embodying the invention, in many instances it is advantageous also to incorporate a physical mixture of lead sulfate and lead oxide. Such a physical mixture can be obtained by combining finely-divided lead sulfate and finely-divided lead oxide in suitable proportions. The fineness of the particle size of these compounds is suitably within the range from about 100 to 300 mesh, and preferably of the order of 200 to 300 mesh. These compounds may be mixed in molar ratios of $PbSO_4$:$PbO$ within the range from 0.4 to 1.1:1, preferably, however, within the range of 0.8 to 1.0:1. The mixture of lead sulfate and lead oxide advantageously is employed in amounts ranging from about 25% to 60% of the total weight of the siloxane portion of the friction element.

In manufacturing friction elements in accordance with this invention, it is preferred first to form a layer of finely-divided siloxane resinous material, which material may have the binder and/or desired additives previously incorporated therein. Upon this layer is then superimposed or deposited a layer of finely-divided, heat-resistant thermosetting resin, which also may, if desired, have suitable binder and/or desired additives incorporated therein. The two layers are subjected to heat and pressure, typically pressures of 1000 to 2000 p. s. i. g. or higher, e. g., 4000 p. s. i. g., although lower pressures sufficient to cause resin flow also may be used. Typical molding temperatures are within the range from about 300° to 400° F., 350° F. being preferred at present. The molding cycle time under such conditions generally may range from about 5 to 60 minutes, preferably 30 minutes.

Superior results are obtained when the thermosetting resin heat softens and flows into the finely-divided siloxane resin before the latter material substantially softens or flows. As a result, there is formed an integral bond between the two layers, with a portion of the thermosetting backing material flowing into and curing within the friction surface siloxane resin member.

After the molding cycle is completed the resultant structure is then generally subjected to a curing or afterbake treatment, which typically may comprise heating the molded element for a period ranging from a relatively short time, e. g., 30 minutes, to a number of hours, e. g., 2 to 16 hours, at an elevated temperature. A typical curing temperature is within the range of about 300° to 600° F., 400° to 500° F. at present being preferred. This afterbake, or curing cycle, typically in practice may range from about one-half to two and one-half hours at 400° F. It will be understood, of course, that the specific curing cycle employed will be dictated by the application intended and the particular materials involved.

An alternative method of preparation involves the flowing of either the siloxane resin onto a preformed layer of the preformed thermosetting resin, or the flowing of a thermosetting resin onto a preformed layer of the siloxane resin, with subsequent molding and curing of the resultant structure in either case. In certain applications this type of procedure is advantageous, although the aforementioned method is preferred in order to obtain a better integral bond between the two layers. In the case of molding and curing one of the layers upon a preformed layer, it will, of course, be understood that it generally is desirable to roughen, etch, cut, or otherwise treat the surface of the preformed layer in order to obtain a better integral bond thereto.

In order that those skilled in the art may better understand the nature of the compositions of the present invention and in what manner the same may be obtained, the following specific examples are offered. For consistency in comparing the compositions of the several examples, a cohydrolyzate of 20 mol percent of ethyl silicon trichloride and 80 mol percent of phenyl silicon trichloride is used throughout as the siloxane material.

EXAMPLE I

Formulation

FRICTIONAL SURFACE LAYER 442 parts of lead monoxide (approximately 300 mesh).

216 parts of fibrous asbestos (none retained on a screen having 0.5" openings, 75% retained on a 12 mesh screen, and 25% retained on a 16 mesh screen).

260 parts of a 61.5% solution in isopropyl ether of the cohydrolyzate of 80 mol percent of phenyl silicon trichloride and 20 mol percent of ethyl silicon trichloride, containing 1.6 parts of triethanolamine (condensation catalyst for the organo-silicon trihalide cohydrolyzate).

BACKING LAYER 130 parts of phenol formaldehyde-asbestos filled resin (Durez 34).

Procedure

The lead monoxide and asbestos are placed in a "Day" mixer (having eccentric contra-rotating masticating members), provided with a mixing chamber jacketed for temperature control by means of steam and/or water. These dry materials are blended in the mixer at room temperature until a substantially uniform mix has been obtained. The solution of the organo-silicon trichloride cohydrolyzate is added to the thoroughly blended combination of lead monoxide and asbestos and the entire mass mixed until substantial uniformity is obtained, after which the solvent is evaporated from the mass by admitting steam to the mixing chamber jacket. After substantially all of the solvent has been evaporated, a pulverulent mass of the mixture is obtained and removed from the mixing chamber. The substantially dry coherent particles of the composition are passed through a "Wiley" hammer mill, wherein the particles are comminuted to a maximum particle size of approximately 5 mesh. The particle size of the pulverized material is controlled by the size of the openings in a screen surrounding the pulverizing chamber.

The pulverulent siloxane material is placed in a mold cavity having an arcuate longitudinal cross section, and the finely-divided phenol formaldehyde resin is deposited on the siloxane layer. A molding 3/16" to 5/16" in thickness, 2½" wide, and 5" arc length is obtained by molding at 360° F. and 4000 pounds per square inch pressure for a period of 1 hour. At the end of this time the mold is cooled to 150° F. and the molded article removed from the mold cavity, placed in a "curing" mold having cavity contours of the same general shape as that of the cavity employed in the initial molding opertaion, and "cured" for a period of 16 hours at 500°–525° F. The cured molding is cooled to room temperature and fixed to a brake shoe as a brake lining element of a small laboratory dynamometer for testing.

The dynamometer comprises a rear brake assembly of an "International K–5" truck equipped with International Harvester 14-inch diameter brake drums No. 95,223H at each end of the flywheel shaft. The dynamometer is so driven as to simulate the energy effect (94,250 foot pounds) on 1 wheel of a 10-ton truck in decelerating from a speed of 45 miles per hour to a position of rest in 6 seconds. The cycle frequency from acceleration from a position of rest to top speed, braking to decelerate to a position of rest, and accelerating again is 35 seconds, except during periods for the removal of brake linings for wear measurements, etc. After 10 to 15 35-second cycles, the brake drum temperature of the brake assembly generally reaches 400°–550° F., occasionally as high as 650° F.; good evidence exists that the actual surface temperature of the lining may go as high as 1400° F.

The coefficient of friction $m$ in this and the other examples hereinafter is calculated from the formula:

$$m = \frac{F}{5.52P + 0.84F}$$

wherein $F$=tangential friction force, $P$=load on the brake shoe, and the constants are derived from other formulae developed by analysis of brake members for the particular dynamometer assembly.

The coefficients of friction noted in this and the following examples are calculated from data taken during deceleration in a cycle or series of cycles, whereas the drum temperatures corresponding to these coefficients of friction are taken before the acceleration in a cycle or averaged at such times over a series of cycles, because of the wide temperature fluctuations occurring during the deceleration of the dynamometer load. The temperatures noted in the results given below therefore represent minimum rather than maximum or average drum temperatures during a given cycle.

Test results

The calculated rate of wear per thousand cycles based on 147 cycles is 0.052 inch.

FRICTION CHARACTERISTICS

| Brake Drum Temperature, ° F. | Coefficient of Friction |
| --- | --- |
| Room Temperature | 0.27 |
| 400 | 0.31 |
| 645 | 0.52 |

EXAMPLE II

Formulation

FRICTIONAL SURFACE LAYER 216 parts of lead sulfate (approximately 300 mesh).

273 parts of a 61.5% solution in isopropyl ether of the cohydrolyzate of 80 mol percent of phenyl silicon trichloride and 20 mol percent of ethyl silicon trichloride, containing 1.6 parts of triethanolamine (condensation catalyst for the cohydrolyzate).

424 parts of asbestos fibers (of the same grade as that used in Example I).

BACKING LAYER 456 parts of melamine-formaldehyde resin.

Procedure

These ingredients are mixed together in precisely the same manner as that described for the composition of Example I and a molded brake lining element obtained from this composition.

Test results

The calculated rate of wear per thousand cycles based on 115 cycles is 0.68 inch.

FRICTION CHARACTERISTICS

| Brake Drum Temperature, ° F. | Coefficient of Friction |
| --- | --- |
| Room Temperature | 0.55 |
| 395 | 0.40 |
| 605 | 0.32 |

EXAMPLE III

Formulation

FRICTIONAL SURFACE LAYER

A. 76.5 parts of the dry comminuted partially condensed cohydrolyzate of a mixture of 80 mol percent of phenyl silicon trichloride and 20 mol percent of ethyl silicon trichloride.

25.5 parts of the butadiene-acrylonitrile elastomeric copolymer available under the trade-name "Hycar."

0.6 part sulfur.

Procedure

The butadiene-acrylonitrile copolymer is milled on a rubber mill having a roll speed differential of 2–3 until a substantially continuous sheet thereof is obtained. The milling of the butadiene-acrylonitrile copolymer is continued and the 76.5 parts of the partially condensed cohydrolyzate added thereto and the milling continued until a substantially uniform mixture is obtained, after which the sulfur is added as a curing catalyst for the butadiene-acrylonitrile elastomer. Thereafter, the mix is removed from the rubber mill as a substantially continuous sheet, which is cooled by means of Dry Ice to a temperature at which the mass becomes brittle and readily friable. The cold brittle mass is placed in a "Wiley" hammer mill and comminuted to a maximum particle size of approximately 5 mesh.

B. 168 parts of lead sulfate (approximately 300 mesh).
132 parts of lead oxide (approximately 300 mesh).
198 parts of asbestos fibers (of the same grade as that used in Example I).

BACKING LAYER 55 parts phenol formaldehyde resin containing fibrous asbestos filler.

Procedure

The lead sulfate, lead monoxide, and asbestos fibers are placed in a "Day" mixer and mixed together in the manner described in Example I above until a substantially uniform mixture has been obtained, after which the comminuted resinous mixture of "Hycar," partially condensed siloxane resins, and triethanolamine is added to the batch during the mixing operation and the mixing continued until the mixture is uniform. Methyl ethyl ketone, in an amount sufficient to set the entire mass and render it plastic, is added during the mixing operation in order substantially to coat all of the particles of the dry inorganic materials with a solution of the resinous material. Thereafter the solvent is driven from the batch in a manner described in Example I and the pulverulent mass thus obtained comminuted in a "Wiley" hammer mill to a maximum particle size of approximately 5 mesh. This material is placed in a mold cavity together with a superimposed layer of thermosetting, heat-resistant phenol formaldehyde resin in accordance with the technique described in Example I.

Test results

The calculated rate of wear per thousand cycles based on 2000 cycles is 0.0068 inch.

FRICTION CHARACTERISTICS

| Brake Drum Temperature, ° F. | Coefficient of Friction |
| --- | --- |
| Room Temperature | 0.31 |
| 425 | 0.47 |
| 500 | 0.60 |
| 590 | 0.55 |

EXAMPLE IV

A brake lining mix is prepared by blending in a "Day" mixer the following ingredients, which are expressed in percent by weight of the total mass:

| | Percent |
| --- | --- |
| Siloxane resin (dry comminuted partially condensed cohydrolyzate of a mixture of 80 mol percent phenyl silicon trichloride and 20 mol percent ethyl silicon trichloride) | 15 |
| "Hycar" copolymer (butadiene-acrylonitrile elastomeric copolymer) | 5 |
| Fibrous asbestos (fiber length ¼" to ½") | 30 |
| Lead monoxide | 22 |
| Lead sulfate | 29 |

The above mixture is dried and ground to a powder in a "Wiley" mill. A frictional element mold is prepared from the foregoing mix, backing the siloxane material with a phenolic resin in the manner set forth in Example I. The resultant friction element exhibits excellent integral bonding between the backing and siloxane layers and frictional characteristics substantially the same as obtained in the foregoing examples.

EXAMPLE V

A friction element is prepared according to the procedure of Example IV by using the following formulation, wherein the quantities are expressed in percent by weight:

| | Percent |
| --- | --- |
| Siloxane resin (dry comminuted partially condensed cohydrolyzate of a mixture of 80 mol percent phenyl silicon trichloride and 20 mol percent of ethyl silicon trichloride) | 15 |
| "Hycar" copolymer (butadiene-acrylonitrile elastomeric copolymer) | 5 |
| Fibrous asbestos | 29 |
| Lead oxide | 22 |
| Lead sulfate | 27 |
| Finely-divided graphite | 2 |

Friction elements formed from this mix in accordance with the procedure set forth in Examples I and IV exhibit excellent frictional surface characteristics as well as high strength and shock resistance.

EXAMPLE VI

To illustrate the singular improvement in friction element strength obtained by the practice of this invention six friction elements (½" x ⅜" x 5") are formed from the same batch of siloxane resinous material comprising a mixture of 15% by weight of dry comminuted partially condensed cohydrolyzate of a mixture of 80 mol percent phenyl silicon trichloride, 20 mol percent of ethyl silicon trichloride, 30% by weight of fibrous asbestos (fiber length ¼" to ½"), 27% by weight of lead sulfate, 26% by weight lead oxide, and 2% of finely-divided graphite.

To one-half of these friction elements is applied a phenol formaldehyde resin backing (Durez 34), the thus treated elements having the dimensions of ½" x ½" x 5". Both the phenol formaldehyde-backed siloxane friction elements and the unbacked elements are subjected to a mold cycle of 30 minutes at 350° F. under a pressure of 4000 p. s. i. g. Following the molding, both types of friction elements are cured for 2 hours at 400° F.

The friction elements are then subjected to flexural testing in a Tinius Olsen Plastiversal testing machine. In this machine each of the 5" rods is secured over ½" of its length at each end and a vertical load applied at the center of the test specimen at a rate from 0.05 to 0.2" per minute until fracture of the test specimen occurs. The results of such tests are indexed comparatively in the following table, with flexural strengths calculated according to the formula:

$$\text{Flexural strength (p. s. i.)} = \frac{3PL}{2BD^2}$$

where $P$ = applied pressure (pounds)
$L$ = length of unsupported span (inches)
$B$ = breadth of specimen (inches)
$D$ = depth of specimen (inches)

| Specimen No. | L | B | D | P | Flexural Strength |
| --- | --- | --- | --- | --- | --- |
| 1 | 4.0 | 0.561 | 0.369 | 52.0 | 4,083 |
| 2 | 4.0 | 0.561 | 0.373 | 47.5 | 3,654 |
| 3 | 4.0 | 0.559 | 0.368 | 51.0 | 4,042 |
| 4 | 4.0 | 0.553 | 0.530 | 135.5 | 5,245 |
| 5 | 4.0 | 0.555 | 0.531 | 159.0 | 6,096 |
| 6 | 4.0 | 0.574 | 0.530 | 162.5 | 6,055 |

The foregoing data indicates the increase in flexural strength obtained by the practice of this invention. The thermosetting resin-backed specimens, i. e., Nos. 4, 5, and 6, exhibit an average flexural strength of 5799 p. s. i., while identically treated, unbacked siloxane specimens, i. e., Nos. 1, 2, and 3, have a much lower average flexural strength of 3926 p. s. i. Examination of the thermosetting resin-backed test specimens reveals no delamination or separation of layers, as would be expected when a non-integrally bonded laminated structure is subjected to severe simultaneous compression and tension in flexural testing.

While the foregoing examples have illustrated various embodiments of the invention with particular reference to strength and surface properties, those skilled in the art will realize that friction elements in accordance with this invention may be employed in a variety of applications, including vehicles, such as automobile, truck, and trailer applications, as well as in the aircraft field. Specific applications include brake linings, clutch facings, and other frictional surface mechanisms. In practice, brake linings and clutch facings may be secured to a metallic support member either by mechanical fasteners, such as rivets or bolts, or by direct fusion with or without an intermediate plastic or other adhesive. Accordingly, it will be appreciated that brake linings and clutch facings, as well as other friction elements of this invention, may be secured to metallic support members by riveting, bolting, or by adhesive bonding thereto. In the case of adhesive bonding applications, this invention also contemplates the simultaneous formation, molding, and curing of a unitary structure comprising a metallic support having secured thereto a friction element including a frictional surface layer formed of a siloxane resin, said surface layer being integrally bonded to said support through a heat-resistant thermosetting resin backing layer.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of forming a frictional element comprising the steps of superimposing on a layer of finely-divided, uncured siloxane resinous material containing a cohydrolyzate of a mixture of from 70–90 mol percent of phenyl silicon trihalide and 10–30 mol percent of ethyl silicon trihalide, a layer of finely-divided, heat-flowable thermosetting resin, and applying heat and pressure to the two layers for a time sufficient to insure heat flow of both layers.

2. The method according to claim 1 wherein said cohydrolyzate is that of a mixture of phenyl silicon trichloride and ethyl silicon trichloride, and the thermosetting resin is more readily heat-flowable than is the siloxane resinous material.

3. The method according to claim 1 wherein the resultant product is subjected to an additional heat curing step.

4. The method according to claim 2 wherein the resultant product is subjected to an additional heat curing step.

5. A friction element comprising a frictional surface layer formed of a hard cohydrolyzate of a mixture of from 70 to 90 mol percent phenyl silicon trichloride and from 10 to 30 mol percent ethyl silicon trichloride, said layer having bonded thereto a reinforcing backing of a hard thermosetting resin.

6. A friction element comprising a frictional surface layer formed of a hard cohydrolyzate of a mixture of 80 mol percent phenyl silicon trichloride and 20 mol percent ethyl silicon trichloride, said layer having bonded thereto a reinforcing backing of a hard thermosetting resin.

7. A friction element as in claim 5 wherein the frictional surface layer contains 20% to 50% by weight of fibrous asbestos.

8. A friction element as in claim 6 wherein the frictional surface layer contains 20% to 50% by weight of fibrous asbestos.

9. A friction element including a frictional surface layer comprising a hard, heat-resistant mixture of asbestos filler and a cohydrolyzate of a mixture of 80 mol percent phenyl silicon trichloride and 20 mol percent ethyl silicon trichloride, said layer having bonded thereto a backing layer of a phenolic resin.

References Cited in the file of this patent

UNITED STATES PATENTS

| Number | Name | Date |
|---|---|---|
| 2,272,532 | Shriver | Feb. 10, 1942 |
| 2,293,914 | Nanfeldt | Aug. 25, 1942 |
| 2,416,427 | Bonawit et al. | Feb. 25, 1947 |
| 2,452,284 | Beare | Oct. 26, 1948 |
| 2,611,727 | Underwood et al. | Sept. 23, 1952 |